(12) United States Patent
You et al.

(10) Patent No.: US 12,372,608 B2
(45) Date of Patent: Jul. 29, 2025

(54) RADAR CONTROL DEVICE AND METHOD

(71) Applicant: HL Klemove Corp., Incheon (KR)

(72) Inventors: Kyung Jin You, Anyang-si (KR); Jae Ho Huh, Seoul (KR)

(73) Assignee: HL Klemove Corp., Incheon (KR)

( * ) Notice: Subject to any disclaimer, the term of this patent is extended or adjusted under 35 U.S.C. 154(b) by 370 days.

(21) Appl. No.: 17/831,669

(22) Filed: Jun. 3, 2022

(65) Prior Publication Data

US 2023/0077061 A1 Mar. 9, 2023

(30) Foreign Application Priority Data

Sep. 7, 2021 (KR) .................. 10-2021-0118998

(51) Int. Cl.
*G01S 7/34* (2006.01)
*G01S 7/40* (2006.01)
*G01S 13/931* (2020.01)

(52) U.S. Cl.
CPC ........... *G01S 7/34* (2013.01); *G01S 7/40* (2013.01); *G01S 13/931* (2013.01)

(58) Field of Classification Search
CPC ........................................................ G01S 7/40
See application file for complete search history.

(56) References Cited

U.S. PATENT DOCUMENTS

2021/0156980 A1* 5/2021 Stettiner ............... G01S 7/2883

FOREIGN PATENT DOCUMENTS

KR 10-2019-0096291 A 8/2019

OTHER PUBLICATIONS

Office Action issued in Korean Patent Application No. 10 2021 0118998 dated Feb. 20, 2025.
Office Action from Korean Patent Office, dated Oct. 29, 2024.

* cited by examiner

*Primary Examiner* — Vladimir Magloire
*Assistant Examiner* — Eric K Hodac
(74) *Attorney, Agent, or Firm* — Harvest IP Law, LLP (57) ABSTRACT

The disclosure relates to a radar control device and method. Specifically, according to the disclosure, a radar control device comprises a transceiver transmitting a first transmission signal, receiving a first reception signal reflected by an object, and mixing and transmitting the first transmission signal and a second transmission signal having a center frequency different from the first transmission signal based on the first transmission signal, a generator producing a discrete signal by passing the first transmission signal and the first reception signal through a mixer and sampling the first transmission signal and the first reception signal and generating a window for compensation based on a required time and a modulation band set in the second transmission signal, and a producer producing the compensation signal based on the discrete signal and the window for compensation.

14 Claims, 6 Drawing Sheets

RADAR CONTROL DEVICE AND METHOD

CROSS-REFERENCE TO RELATED APPLICATION

This application claims priority from Korean Patent Application No. 10-2021-0118998, filed on Sep. 7, 2021, which is hereby incorporated by reference for all purposes as if fully set forth herein.

BACKGROUND

Field

The present embodiments relate to a radar control device and method.

Description of Related Art

Recently, radar-equipped vehicles are increasing. Based on the information output from the radar mounted to the vehicle, the electronic control unit of the vehicle may calculate the distances, relative speeds, and angles between the host vehicle and objects around the host vehicle.

As such, a radar-equipped vehicle may provide various safety functions or convenience functions using the distance, relative speed, and angle between the host vehicle and an object around.

However, since the radar does not have the same gain from the lowest to highest frequency occupied by its radiated signals, it is hard to estimate the reflectivity of the object. Further, since the antenna gain differs per center frequency, it may be an obstacle to the radar in detecting the object.

BRIEF SUMMARY

In the foregoing background, the disclosure provides a radar control device and method for producing a compensation signal corresponding to each signal to make the antenna gain irrelevant to the frequency.

To achieve the foregoing objectives, according to an aspect of the disclosure, there is provided a radar control device comprising a transceiver transmitting a first transmission signal, receiving a first reception signal reflected by an object, and mixing and transmitting the first transmission signal and a second transmission signal having a center frequency different from a center frequency of the first transmission signal based on the first transmission signal, a generator producing a discrete signal by passing the first transmission signal and the first reception signal through a mixer and sampling the first transmission signal and the first reception signal and generating a window for compensation based on a required time and a modulation band set in the second transmission signal, and a producer producing a compensation signal based on the discrete signal and the window for compensation.

According to another aspect of the disclosure, there is provided a radar control method comprising a transmission/reception step of transmitting a first transmission signal, receiving a first reception signal reflected by an object, and mixing and transmitting the first transmission signal and a second transmission signal having a center frequency different from a center frequency of the first transmission signal based on the first transmission signal, a compensation window generation step of producing a discrete signal by passing the first transmission signal and the first reception signal through a mixer and sampling the first transmission signal and the first reception signal and generating a window for compensation based on a required time and a modulation band set in the second transmission signal, and a compensation signal production step of producing a compensation signal based on the discrete signal and the window for compensation.

According to the disclosure, the radar control device and method may generate a window for compensation not to be affected by the center frequency, thereby removing obstacles to object detection.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a radar control device according to an embodiment of the disclosure is described with reference to the accompanying drawings.

Figure 1:
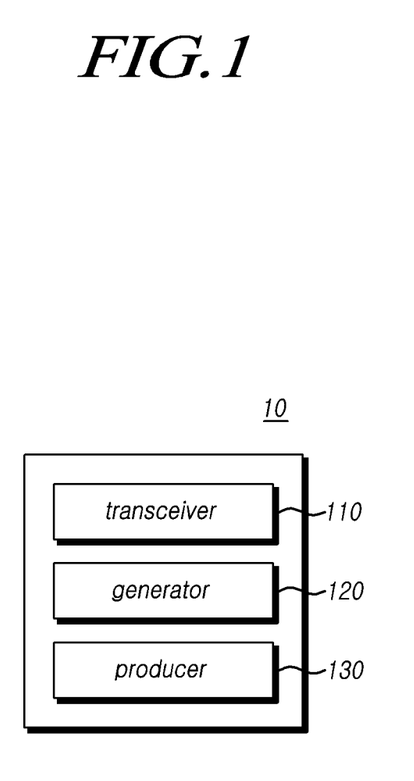
FIG. 1 is a block diagram illustrating a radar control device according to an embodiment of the disclosure.

FIG. 1 is a block diagram illustrating a radar control device according to an embodiment of the disclosure.

Referring to FIG. 1, according to an embodiment of the disclosure, a radar control device may include a transceiver, a generator, and a producer.

According to an embodiment of the disclosure, the radar control device may be an advance driver assistance system (ADAS) that is equipped in a host vehicle to provide information helpful for driving the host vehicle or assist the driver in the host vehicle.

Here, ADAS may refer to various types of advanced driver assistance systems and may include, e.g., autonomous emergency braking, smart parking assistance system (SPAS), blind spot detection (BSD), adaptive cruise control (ACC), lane departure warning system (LDWS), lane keeping assist system (LKAS), and lane change assist system (LCAS). However, embodiments of the disclosure are not limited thereto.

The host vehicle may refer to a vehicle that is equipped with a prime mover to roll the wheels by the power therefrom to move on the ground without a pre-built railway or track. Further, the host vehicle may be an electric vehicle that is an electricity-powered vehicle that obtains driving energy by rotating a motor with electricity from a battery rather than obtaining driving energy from combustion of a fossil fuel.

The radar control device is applicable both where the host vehicle is a manned vehicle or where the host vehicle is an autonomous vehicle.

The transceiver may transmit a first transmission signal, receive a first reception signal reflected by an object, mix it with a second transmission signal having a center frequency different from a center frequency of the first transmission signal based on the first transmission signal, and transmit the mixed signals.

Figure 2:
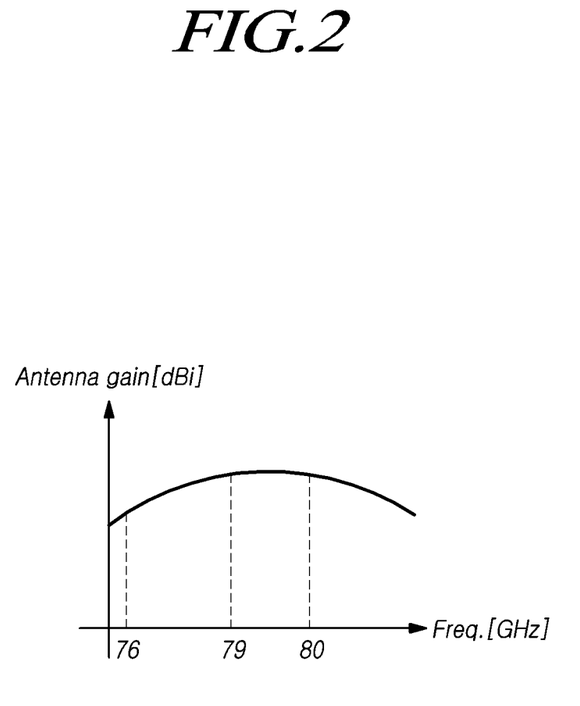
FIGS. 2 and 3 are views illustrating the relationship between the frequency and antenna gain of the signal transmitted/received by a radar control device according to an embodiment of the disclosure.
Figure 3:
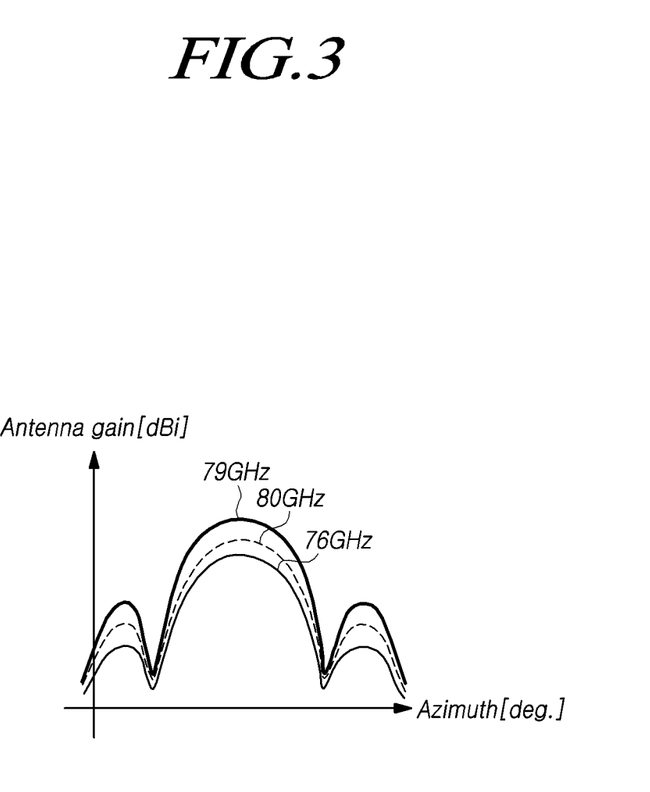

FIGS. 2 and 3 are views illustrating the relationship between the frequency and antenna gain of the signal transmitted/received by a radar control device according to an embodiment of the disclosure.

Referring to FIG. 2, the radar control device may identify that the antenna gain calculated by transmitting/receiving a signal may vary depending on the center frequency of the transmitted/received signal, i.e., an electromagnetic wave.

Referring to FIG. 3, the antenna having the antenna characteristics of FIG. 2 may have a different gain depending on its mounting angle. It may be identified that the overall shape of the transmitted/received signal is maintained but the antenna gain may be varied depending on the center frequency of the signal.

Since the antenna gain is inversely proportional to the square of the wavelength according to the physical law, the gain of an antenna using broadband signals may not remain the same in all bands used. Accordingly, a typical antenna may be designed so that the antenna gain is symmetrically attenuated with respect to the frequency determined to provide the largest gain.

Thus, since the gain is not completely identical from the lowest to highest frequency occupied by the signal of the antenna, the per-distance attenuation is not exactly inversely proportional to the distance to the power of four. Thus, it is hard to estimate the reflectivity (radar cross section (RCS)) of object which is estimated based on the per-distance attenuation. Further, since the antenna gain differs per center frequency, the mean received power may differ. Further, since the object may not be estimated as the same if the amount of power differs despite use of the same modulation, the difference in antenna gain may be an obstacle to detecting the object.

In an example, in the disclosure, the center frequency may be defined as a mean of the frequency bands occupied by the chirp signal.

To that end, the radar control device may include an antenna unit.

The antenna unit may include one or more transmission antennas and one or more reception antennas. Each transmission/reception antenna may be an array antenna including one or more radiation elements connected in series through feeding lines but is not limited thereto.

The antenna unit may include a plurality of transmission antennas and a plurality of reception antennas and may have various array structures depending on the arrayed order and arrayed interval.

In an embodiment, if each antenna unit includes one transmission antenna and one reception antenna, the transmission antenna may include a first transmission channel and a second transmission channel, and the reception antenna may include a first reception channel and a second reception channel.

In another embodiment, if each antenna unit includes a plurality of transmission antennas and reception antennas, the first transmission antenna and the second transmission antenna may include a first transmission channel and a second transmission channel, respectively, and the first reception antenna and the second reception antenna may include a first reception channel and a second reception channel, respectively.

The transceiver 110 may function to switch to one of the plurality of transmission antennas included in the antenna unit to transmit a transmission signal through the switched transmission antenna or to transmit transmission signals through multiple transmission channels assigned to the plurality of transmission antennas.

The transceiver may include an oscillation unit that generates transmission signals for one transmission channel allocated to the switched transmission antenna or multiple transmission channels allocated to the plurality of transmission antennas. The oscillation unit may include, e.g., a voltage-controlled oscillator (VCO) and an oscillator.

The transceiver 110 may receive a reception signal reflected by the object, through the reception antenna.

The transceiver may switch to one of the plurality of reception antennas and receive the reception signal, which is the transmission signal reflected by the target, through the switched reception antenna or receive the reception signal through multiple reception channels allocated to the plurality of reception antennas.

The transceiver may include, e.g., a low noise amplifier (LNA) that low-noise amplifies the reception signal, which is received through one reception channel allocated to the switched reception antenna or through multiple reception channels allocated to the plurality of reception antennas, a mixer that mixes the low-noise amplified reception signal, an amplifier that amplifies the mixed reception signal, and an analog-digital converter (ADC) that converts the amplified reception signal into a digital signal to thereby generate reception data.

The transceiver may further mix a third transmission signal having a center frequency different from the center frequency of the second transmission signal and a fourth transmission signal having a center frequency different from the center frequency of the third transmission signal and transmit the mixed signals.

The mixing of these signals may be performed by the above-described mixer or by a separate mixer. In summary, the transceiver may mix the first transmission signal, the second transmission signal, the third transmission signal, and the fourth transmission signal and transmit the mixed signals and may receive the first reception signal, the second reception signal, the third reception signal, and the fourth reception signal included in the mixed reception signals.

Referring back to FIG. 1, the generator may produce a discrete signal by passing the first transmission signal and the first reception signal through the mixer and sampling them and may generate a window for compensation based on the required time and modulation band set in the second transmission signal.

The discrete signal may be a signal (ADC Signal) which is a digital signal into which an analog signal has been converted by the above-described converter.

Specifically, the compensation window may be generated such that the product of the compensation window and the discrete signal becomes a constant. The compensation window may be generated such that the compensation window has the same size as the discrete signal. Since the product of the discrete signal and the window is made by sample by sample, the calculation itself may be impossible if the sizes are not the same. That the product becomes a constant may mean that the product of the nth sample of the discrete signal and the nth sample of the window is the same as the product of the mth sample of the discrete signal and the mth sample of the window.

The compensation window may be produced by applying the required time and modulation band set in the second transmission signal to the graph of the frequency and antenna gain of FIG. 2. For example, if the required time is [1, 2, 3, 4, 5] (s) and the modulation band is 76 GHz to 78 GHz, and the antenna gain of the modulation band during the required time in FIG. 2 is [10, 12, 13, 14, 14] (dBi, log-scale), the compensation window may be produced as $$[10^{-\frac{10}{10}}, 10^{-\frac{11}{10}}, 10^{-\frac{13}{10}}, 10^{-\frac{14}{10}}, 10^{-\frac{14}{10}}]$$

(linear-scale).

The producer may produce the compensation signal based on the discrete signal and the compensation window.

Specifically, the producer may produce the compensation signal by multiplying the discrete signal by the compensation window and performing discrete Fourier transform.

To express this as an equation, if the generated discrete signal is defined as x[n] and the generated compensation window is defined as w[n], the compensation signal X[k] may be expressed as in Equation 1 below.

$$X[k] = \sum_{n=0}^{N-1} x[n] \cdot w[n] \cdot \exp\left(-j\frac{2\pi k}{N}n\right) \qquad \text{[Equation 1]}$$

Here, n may mean the sample index, and the product of the discrete signal and the compensation window may mean the product by sample by sample, i.e., on a per-sample basis.

The compensation signal is produced not only for the second transmission signal but also for each of a plurality of signals when a plurality of transmission signals are transmitted and their corresponding signals are received. The required time and modulation band set in the plurality of transmission signals may be preset for each antenna specification transmitted/received or may be set according to preset criteria by the producer.

Figure 4:
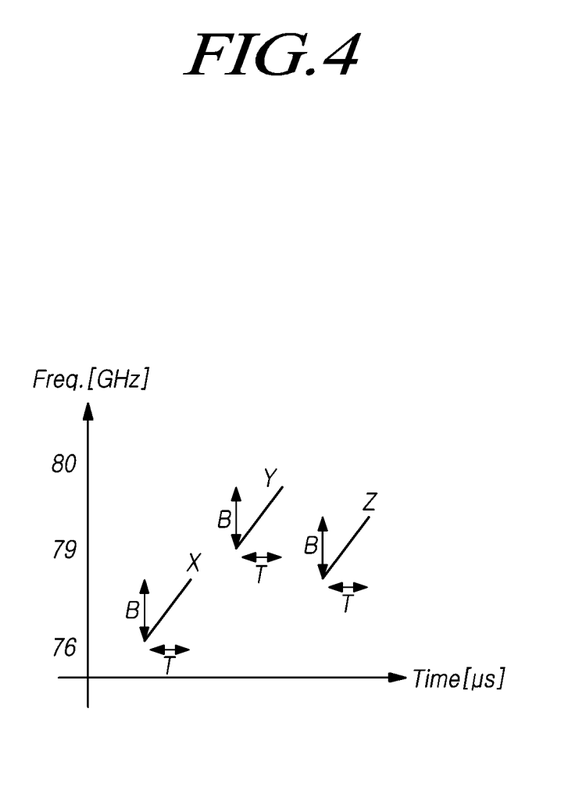
FIG. 4 is a view illustrating transmission of a plurality of signals having different center frequencies according to an embodiment.
Figure 5:
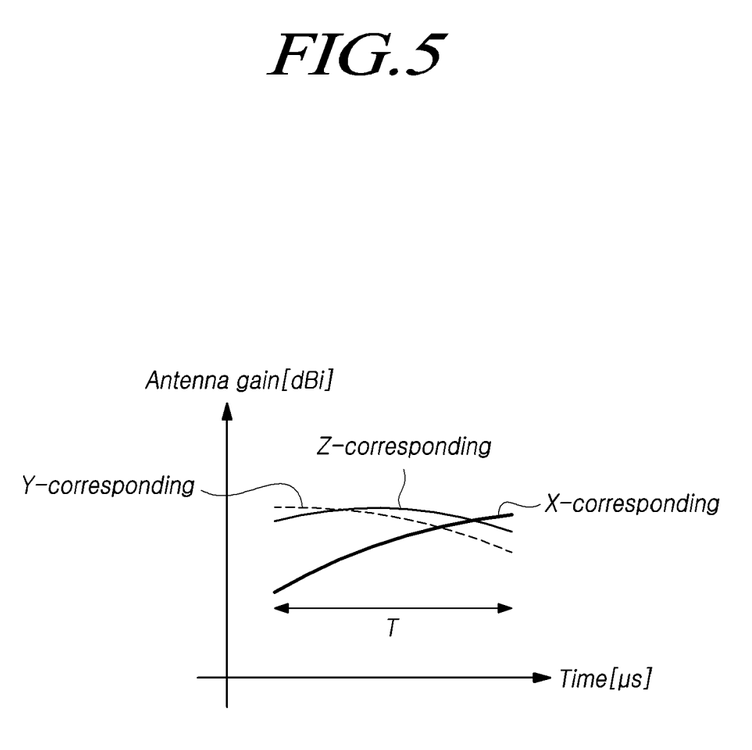
FIG. 5 is a view illustrating transmission/reception of the signals of FIG. 4 by an antenna having the characteristics of FIG. 2 according to an embodiment.

FIG. 4 is a view illustrating transmission of a plurality of signals having different center frequencies according to an embodiment. FIG. 5 is a view illustrating transmission/reception of the signals of FIG. 4 by an antenna having the characteristics of FIG. 2 according to an embodiment.

Referring to FIG. 4, T in FIG. 4 may denote the required time, and B may denote the modulation band. X, Y, and Z may refer to any transmission signals having different center frequencies.

The transceiver may transmit the second transmission signal, the third transmission signal, and the fourth transmission signal in which the same required time interval and the same modulation band interval have been set. For example, the transceiver may mix and transmit the second transmission signal, the third transmission signal, and the fourth transmission signal each of which has a required time interval of 2 s and a modulation band interval of 2 GHz.

The transceiver may transmit the second transmission signal, the third transmission signal, and the fourth transmission signal set to have different modulation bands. For example, the transceiver may transmit the second transmission signal to have a modulation band of 76 GHz to 78 GHz, the third transmission signal to have a modulation band of 78 GHz to 80 GHz, and the fourth transmission signal to have a modulation band of 80 GHz to 82 GHz. As another example, the transceiver may transmit the second transmission signal to have a modulation band of 76 GHz to 78 GHz, the third transmission signal to have a modulation band of 77 GHz to 79 GHz, and the fourth transmission signal to have a modulation band of 78 GHz to 80 GHz.

The transceiver may transmit the second transmission signal, the third transmission signal, and the fourth transmission signal set to have different required time intervals. For example, the transceiver may transmit the second transmission signal to have a required time interval of 1 μs to 3 μs, the third transmission signal to have a required time interval of 3 μs to 5 μs, and the fourth transmission signal to have a required time interval of 5 μs to 7 μs. As another example, the transceiver may transmit the second transmission signal to have a required time interval of 1 μs to 3 μs, the third transmission signal to have a required time interval of 2 μs to 4 μs, and the fourth transmission signal to have a required time interval of 3 μs to 5 μs.

The above-described embodiments for the required times and modulation bands are applicable to the first transmission signal and the first reception time as well.

FIG. 5 is a graph illustrating the antenna gain, over time, corresponding to the required time and modulation band of FIG. 4, as extracted from the graph of FIG. 2. If the radar control device for object detection uses a linear modulation signal, the instantaneous frequency is proportional to the time. Thus, the vertical axis of FIG. 5 is the time but may also be interpreted as the center frequency.

A window for compensation may be generated using the antenna gain corresponding to the time of FIG. 5. The product of the antenna gain corresponding to the time and the window may become a constant, and the product of the antenna gain and the compensation window may be 1.

It may be identified that if the modulated signal of FIG. 4 is transmitted/received, the antenna gain over time differs. In an ideal case, if the antenna gain is irrelevant to frequency, the X corresponding line, Y corresponding line, and Z corresponding line all would be identical but, in reality, it may be identified that the antenna gain is affected by frequency as shown in FIG. 5.

As described above, the radar control device may more precisely detect the object by transmitting and receiving a plurality of signals having different center frequencies.

Further, it is possible to enhance the accuracy of the plurality of signals having different center frequencies by generating a window for compensation to thus generate a compensation signal according to the antenna gain.

The radar control device may be implemented as, e.g., an electronic control unit (ECU).

According to an embodiment, a computer system (not shown), such as the radar control device, may be implemented as an electronic control unit (ECU). The ECU may include at least one or more of one or more processors, a memory, a storage unit, a user interface input unit, or a user interface output unit which may communicate with one another via a bus. The computer system may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a radar control method using the radar control device capable of performing the above-described embodiments of the disclosure.

Figure 6:
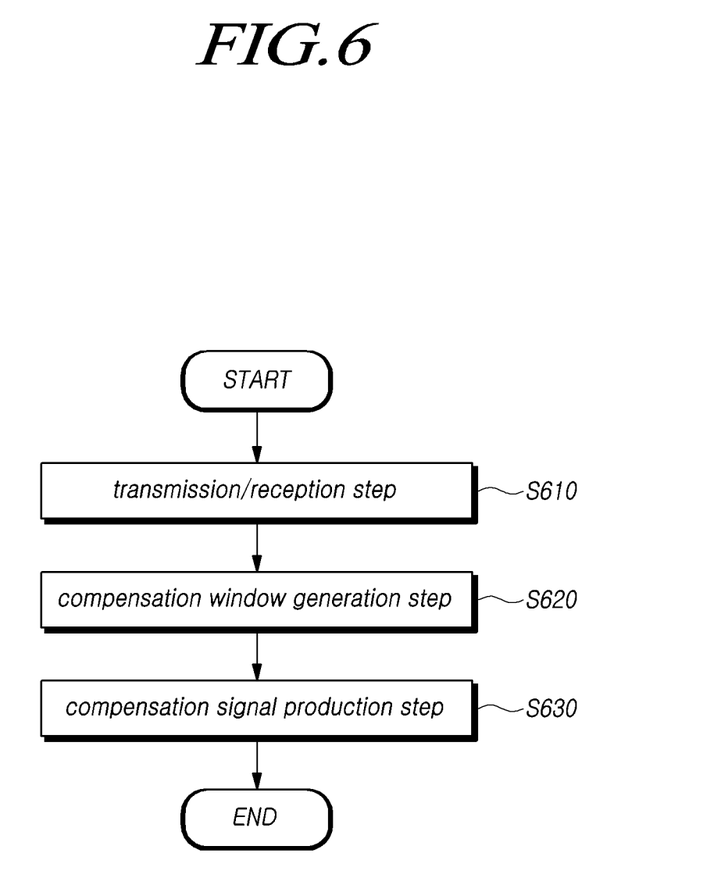
FIG. 6 is a flowchart illustrating a radar control method according to an embodiment of the disclosure.

FIG. 6 is a flowchart illustrating a radar control method according to an embodiment of the disclosure.

Referring to FIG. 6, according to the disclosure, a radar control method comprises a transmission/reception step S610 of transmitting a first transmission signal, receiving a first reception signal reflected by an object, and mixing and transmitting the first transmission signal and a second transmission signal having a center frequency different from a center frequency of the first transmission signal based on the first transmission signal, a compensation window generation step S620 of producing a discrete signal by passing the first transmission signal and the first reception signal through a mixer and sampling the first transmission signal and the first reception signal and generating a window for compensation based on a required time and a modulation band set in the second transmission signal, and a compensation signal production step S630 of producing the compensation signal based on the discrete signal and the window for compensation.

The compensation window may be generated such that the product of the compensation window and the discrete signal becomes a constant.

The compensation signal may be produced by multiplying the discrete signal by the compensation window and performing discrete Fourier transform. The compensation window may be generated such that the compensation window has the same size as the discrete signal.

The transmission/reception step S610 may further mix a third transmission signal having a center frequency different from the center frequency of the second transmission signal and a fourth transmission signal having a center frequency different from the center frequency of the third transmission signal and transmit the mixed signals.

The compensation window generation step S620 may generate each compensation window based on the required time and modulation band set in the third transmission signal and the fourth transmission signal.

The transmission/reception step S610 may transmit the second transmission signal, the third transmission signal, and the fourth transmission signal in which the same required time interval and the same modulation band interval have been set.

The transmission/reception step S610 may transmit the second transmission signal, the third transmission signal, and the fourth transmission signal set to have different modulation bands.

The transmission/reception step S610 may transmit the second transmission signal, the third transmission signal, and the fourth transmission signal set to have different required time intervals.

As described above, according to the disclosure, the radar control device and method may generate a window for compensation not to be affected by the center frequency, thereby removing obstacles to object detection.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:
1. A radar control device, comprising:
a transceiver transmitting a first transmission signal, receiving a first reception signal reflected by an object, and mixing a second transmission signal having a center frequency different from a center frequency of the first transmission signal with the first transmission signal to transmit a mixed transmission signal of the first transmission signal and the second transmission signal;

a generator producing a discrete signal by passing the first transmission signal and the first reception signal through a mixer, sampling a signal output from the mixer, and generating a window for compensation based on a required time interval of the second transmission signal and a modulation band interval of the second transmission signal; and a producer producing a compensation signal based on the discrete signal and the window for compensation.

2. The radar control device of claim 1, wherein the window for compensation is generated so that a product of the window for compensation and the discrete signal becomes a constant, and the window for compensation is identical in size to the discrete signal.

3. The radar control device of claim 1, wherein the compensation signal is produced by performing a discrete Fourier transform on a product of the discrete signal and the window for compensation.

4. The radar control device of claim 1, wherein the transceiver further mixes a third transmission signal having a center frequency different from the center frequency of the second transmission signal and a fourth transmission signal having a center frequency different from the center frequency of the third transmission signal and transmits a mixed signal of the third transmission signal and the fourth transmission signal, and wherein the generator generates each window for compensation based on required time intervals of the third transmission signal and the fourth transmission signal and modulation band intervals of the third transmission signal and the fourth transmission signal.

5. The radar control device of claim 4, wherein the second transmission signal, the third transmission signal, and the fourth transmission signal all have equal required time intervals and the equal modulation band intervals.

6. The radar control device of claim 4, wherein the second transmission signal, the third transmission signal, and the fourth transmission signal each have different modulation bands.

7. The radar control device of claim 4, wherein the second transmission signal, the third transmission signal, and the fourth transmission signal each have different required time intervals.

8. A radar control method, comprising:

a transmission/reception step of transmitting a first transmission signal, receiving a first reception signal reflected by an object, and mixing a second transmission signal having a center frequency different from a center frequency of the first transmission signal with the first transmission signal to transmit a mixed transmission signal of the first transmission signal and the second transmission signal;

a compensation window generation step of producing a discrete signal by passing the first transmission signal and the first reception signal through a mixer, sampling a signal output form the mixer, and generating a window for compensation based on a required time interval of the second transmission signal and a modulation band interval of the second transmission signal; and a compensation signal production step of producing a compensation signal based on the discrete signal and the window for compensation.

9. The radar control method of claim 8, wherein the window for compensation is generated so that a product of the window for compensation and the discrete signal becomes a constant, and the window for compensation is identical in size to the discrete signal.

10. The radar control method of claim 8, wherein the compensation signal is produced by performing a discrete Fourier transform on a product of the discrete signal and the window for compensation.

11. The radar control method of claim 8, wherein the transmission/reception step further mixes a third transmission signal having a center frequency different from the second transmission signal and a fourth transmission signal having a center frequency different from the third transmission signal and transmits a mixed signal of the third transmission signal and the fourth transmission signal, and wherein the compensation window generation step generates each window for compensation based on required time intervals of the third transmission signal and the fourth transmission signal and modulation band intervals of the third transmission signal and the fourth transmission signal.

12. The radar control method of claim 11, wherein the second transmission signal, the third transmission signal, and the fourth transmission signal all have equal required time intervals and equal modulation band intervals.

13. The radar control method of claim 11, wherein the second transmission signal, the third transmission signal, and the fourth transmission signal each have different modulation bands.

14. The radar control method of claim 11, wherein the second transmission signal, the third transmission signal, and the fourth transmission signal each have different required time intervals.

* * * * *